United States Patent
Leita et al.

(10) Patent No.: US 9,794,278 B1
(45) Date of Patent: Oct. 17, 2017

(54) NETWORK-BASED WHITELISTING APPROACH FOR CRITICAL SYSTEMS

(71) Applicant: Symantec Corporation, Mountain View, CA (US)

(72) Inventors: Corrado Leita, Mountain View, CA (US); Jakob Fritz, Mountain View, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 14/135,123

(22) Filed: Dec. 19, 2013

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| H04L 29/06 | (2006.01) | |

(52) U.S. Cl.
CPC ................. H04L 63/1425 (2013.01)

(58) Field of Classification Search
CPC .................................. H04L 63/1425
USPC ............................................ 726/22
See application file for complete search history.

(56) References Cited

U.S. PATENT DOCUMENTS

| | | | | |
|---|---|---|---|---|
| 8,769,677 B2* | 7/2014 | Vashist et al. | ........ | 726/22 |
| 8,910,285 B2* | 12/2014 | Kolbitsch et al. | ........ | 726/23 |
| 9,177,139 B2* | 11/2015 | Hull Roskos | ...... | G05B 23/0235 |
| 2003/0037136 A1* | 2/2003 | Labovitz | ........ | H04L 12/2602 709/224 |
| 2005/0015624 A1* | 1/2005 | Ginter | ........ | G06F 21/55 726/4 |
| 2007/0294187 A1* | 12/2007 | Scherrer | ........ | 705/75 |
| 2009/0271865 A1* | 10/2009 | Jiang | ........ | 726/23 |
| 2011/0231935 A1* | 9/2011 | Gula et al. | ........ | 726/25 |
| 2011/0238855 A1* | 9/2011 | Korsunsky et al. | ........ | 709/231 |
| 2012/0278890 A1* | 11/2012 | Maatta et al. | ........ | 726/23 |
| 2013/0081136 A1* | 3/2013 | Jiang | ........ | 726/22 |
| 2013/0117847 A1* | 5/2013 | Friedman | ........ | H04L 63/1425 726/22 |
| 2014/0013436 A1* | 1/2014 | Deraison | ........ | 726/25 |
| 2014/0201838 A1* | 7/2014 | Varsanyi et al. | ........ | 726/23 |

OTHER PUBLICATIONS

SilentDefense ICS website, http://www.secmatters.com/products-ics, Netherlands.
Alvaro Cardenas et al, "Research Challenges for the Security of Control Systems", HotSec 2008.

(Continued)

*Primary Examiner* — Morshed Mehedi
*Assistant Examiner* — Khalil Naghdali
(74) *Attorney, Agent, or Firm* — Maschoff Brennan

(57) ABSTRACT

A method for modeling or monitoring a control system is provided. The method includes deriving a plurality of message prototypes from a plurality of messages of the control system, the plurality of messages gathered from the control system during operation of the control system. The method includes deriving relationships among the plurality of message prototypes and constructing a model of the control system, based upon the derived message prototypes and the derived relationships among the plurality of message prototypes, wherein at least one method operation is executed through a processor.

20 Claims, 7 Drawing Sheets

(56) References Cited

OTHER PUBLICATIONS

Industrial Defender website, http://www.industrialdefender.com/ (USA).
Robin Sommer, Vern Paxson, Outside the Closed World: On Using Machine Learning for Network Intrusion Detection, IEEE Security and Privacy 2010.
Weidong Cui et al., "Protocol-Independent Adaptive Replay of Application Dialog", NDSS 2006.
Corrado Leita, Automated protocol learning for the observation of malicious threats, PhD thesis.

\* cited by examiner

| Transition From State | Transition to State | Probability | |
|---|---|---|---|
| $S\phi$ | S1 | 0.8 | |
| $S\phi$ | S2 | 0 | 340 |
| S1 | $S\phi$ | 0.1 | |
| S1 | S2 | 0.5 | |

| From: \ To: | $S\phi$ | S1 | S2 | |
|---|---|---|---|---|
| $S\phi$ | | 0.8 | $\phi$ | ⋯ |
| S1 | 0.1 | | 0.5 | |
| S2 | | | | 342 |
| S3 | | | | |

NETWORK-BASED WHITELISTING APPROACH FOR CRITICAL SYSTEMS

BACKGROUND

Industrial control systems, such as in factories, electrical power plants, refineries, water treatment facilities, other utilities and elsewhere, and other types of control systems, may be vulnerable to cyber-attack in both known and unknown ways. Also, such systems may fail in both known and unknown ways. Utilities are investing an increasing portion of their budgets in improving the security of their networks. The potential impact of a cyber-attack against critical infrastructures such as the power grid is enormous, and governments are encouraging an increase to the current relatively low level of security of these industrial control systems. Reliance on network isolation, used as a primary method of defense by utilities worldwide, was proven to be ineffective and erroneous as confirmed by the Stuxnet attack. While protection products targeted to a particular protocol may be effective in systems using that protocol, the vast numbers of closed, embedded systems using programmable logic controllers and other types of controllers are left unprotected. Yet, access to individual industrial control system (ICS) devices, even for protection purposes, is often difficult. Many vendors prevent operators from installing additional software on hosts, which would void warranties. In addition, many vendors have implemented proprietary extensions to standard protocols for industrial control systems, which offer additional functionalities, but which are nonstandard. Some industrial control system security products work at the network level by implementing parsers for common industrial control system protocols, but these do not necessarily function well for protocols that have been modified with proprietary extensions as above. Since many operators choose to leverage the proprietary extensions, leading to the presence of undocumented interactions in the network that are not easily taken into account, the protection of such environments is suboptimal. Industrial control systems may include controllers having protocols for which there is not yet available a security product. Data diodes, which allow data to flow into an industrial control system but prevent information from leaving the system, are limited in the amount of protection they provide. Knowledge-based intrusion detection can attempt to identify threat vectors by means of specification of their characteristic behavior, but is vulnerable to sophisticated attacks leveraging zero-day exploits to evade detection. Anomaly detection is a promising venue to address the protection of these environments. However, the need to parse and understand network exchanges severely limits its ability to cope with the diversity of configurations in many industrial control systems. Therefore, there is a need in the art for a solution which overcomes the drawbacks described above.

SUMMARY

In some embodiments, a method for modeling or monitoring a control system is provided. The method includes deriving a plurality of message prototypes from a plurality of messages of the control system, the plurality of messages gathered from the control system during operation of the control system. The method includes deriving relationships among the plurality of message prototypes and constructing a model of the control system, based upon the derived message prototypes and the derived temporal and causal relationships among the plurality of message prototypes, wherein at least one method operation is executed through a processor.

In some embodiments, a non-transitory, tangible, computer-readable media having instructions thereupon which, when executed by a processor, cause the processor to perform a method. The method performed by the processor includes categorizing, according to message source, message destination, repeated and unchanging portion of message, and variable parameter portion of message, a plurality of messages of networked controllers in a control system, into types of messages, the plurality of messages collected from a network of the networked controllers. The method includes analyzing the plurality of messages as to temporal periodicity and cause-effect relationships, according to the categorizing. The method includes generating a model of the control system according to the categorizing and the analyzing, the model indicating periodicity in at least one type of message. The model further indicating a cause and effect relationship between at least two types of message, and the model indicating at least one value of a variable parameter in at least one type of message.

In some embodiments, a control system monitoring apparatus is provided. The apparatus includes a memory, a network port configured to couple to a network having a plurality of controllers coupled thereto, and a processor, coupled to the memory and to the network port, the processor configured to perform actions when executing code stored in the memory. The actions include characterizing each of a plurality of messages as to source, destination, unchanging and changing portions of the messages, the plurality of messages communicated among the plurality of controllers and gathered from the network, via the network port, during a training phase. The actions include constructing a time series based on the characterized plurality of messages and extracting a periodicity of repeating messages in the time series, each of the repeating messages having a same unchanging portion of the message. The actions include extracting a statistical range of at least one of the changing portions of the messages, extracting a cause and effect dependency of at least one characterized type of message on another characterized type of message, based on the time series, and forming a model, in the memory, based on the characterized plurality of messages, the periodicity, the statistical range, and the cause and effect dependency. The action include comparing at least one further message, gathered from the network during a monitoring phase, to the model and communicating regarding an anomaly in an event of the comparing showing a deviation of the at least one further message from the model.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3E is an example of a state transition table, which may be used in model generation in accordance with some embodiments.

FIG. 3F is an example of a state matrix, which may be used in model generation in accordance with some embodiments.

DETAILED DESCRIPTION

A method for modeling and/or monitoring a control system, and a related control system monitoring apparatus, are herein disclosed. Embodiments of the method and apparatus offer solutions to the above-discussed problems. These embodiments are premised on the concept of network-based whitelisting. Broadly speaking, whitelisting is the practice of making a list of acceptable aspects of a given subject matter, as opposed to blacklisting which is the practice of making a list of unacceptable aspects, which should be excluded from acceptable examples or embodiments of a given subject matter. Network-based whitelisting, as applied to an industrial control system, involves characterizing acceptable messages observed on a network of the industrial control system, during a training phase or learning phase. From a set of messages gathered during the training or learning phase, a set of message prototypes is generated. Periodicities and dependencies, among other aspects of the messages and message prototypes, are derived. The model of the control system is then generated. After the model is generated, messages of the industrial control system are monitored, and compared to the model. An anomaly is announced when a message deviates from the model.

The training or learning phase, and development and application of the model are protocol agnostic, i.e., a deep knowledge of the protocols is not required. When running at a steady state, an industrial control system is likely to generate a repeated and predictable set of interactions or messages. Through application of the network-based whitelisting, a model can be automatically generated, and applied in order to identify deviations that may be associated with a cyber-attack, or a system failure. By monitoring the network environment in a control system, specifically the messages among devices in the network environment, the control system monitoring apparatus can model the high level network layout of the environment and the network interaction among components, even in the presence of proprietary protocols. After a sufficient amount of observations of the steady-state operation of the control system, the control system monitoring apparatus can be used to enforce the learned model and flag any deviation as suspicious. It should be appreciated that this allows immediate pinpointing of any anomaly introduced, for instance by a cyber-attack trying to influence the correct operation of the system.

Figure 1:
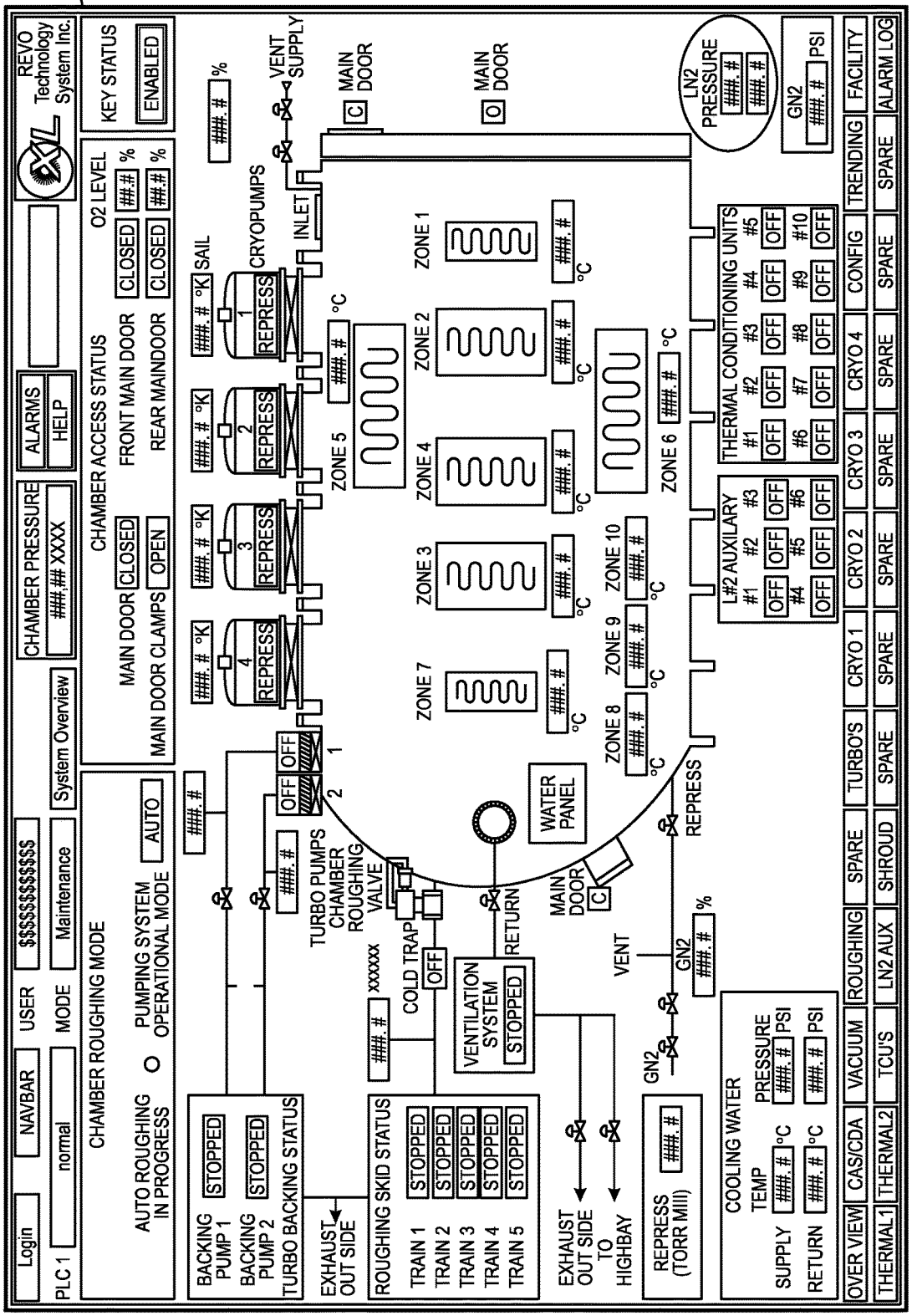
FIG. 1 is an example of a human-machine interface for an industrial control system in accordance with some embodiments.

FIG. 1 is an example of a human-machine interface 102 for an industrial control system. This could be, for instance, as seen on a graphical user interface (GUI) on a computer monitor screen. Typically, the human-machine interface 102 shows status of equipment being operated by controllers, such as whether valves are open or closed, chamber doors are open or closed, pumps are operating or stopped, a ventilation system is operating or stopped, vents are open or closed, pumps are operating or stopped, equipment is enabled or disabled, a process is started, in progress, or stopped, etc. The human-machine interface 102 typically also shows values of various operating parameters, such as temperature, pressure, liquid or gas flows, gas or liquid levels, in various zones, tanks, pipes, chambers, and so on. The example of the human-machine interface 102 shown in FIG. 1 is for illustrative purposes and not meant to be limiting as other industrial control systems will have equipment, controllers and interfaces specific to those systems.

During daily operation, an industrial control system normally runs at a steady state and produces a predictable amount of periodic interactions among the components of the industrial control system. The layout of the industrial control system is mostly static over a number of years, with a fixed number of devices participating in a network, and each device having a very specific role in the control system operation. The role of each device reflects on the dynamic interactions among the devices. In a distributed control system (DCS) environment a controller, for example, reports on a pre-configured interval the internal states of devices the controller monitors. These reports may be sent to a DCS server, which then sends information to the human-machine interface 102 on a regular basis, to graphically report to an operator the current state of the control system. Embodiments of the presently disclosed method and apparatus leverage this situation and regularity to "freeze" the control system dynamics from a network perspective and distinguish any device interaction that does not match the steady-state operation of the physical system.

Figure 2:
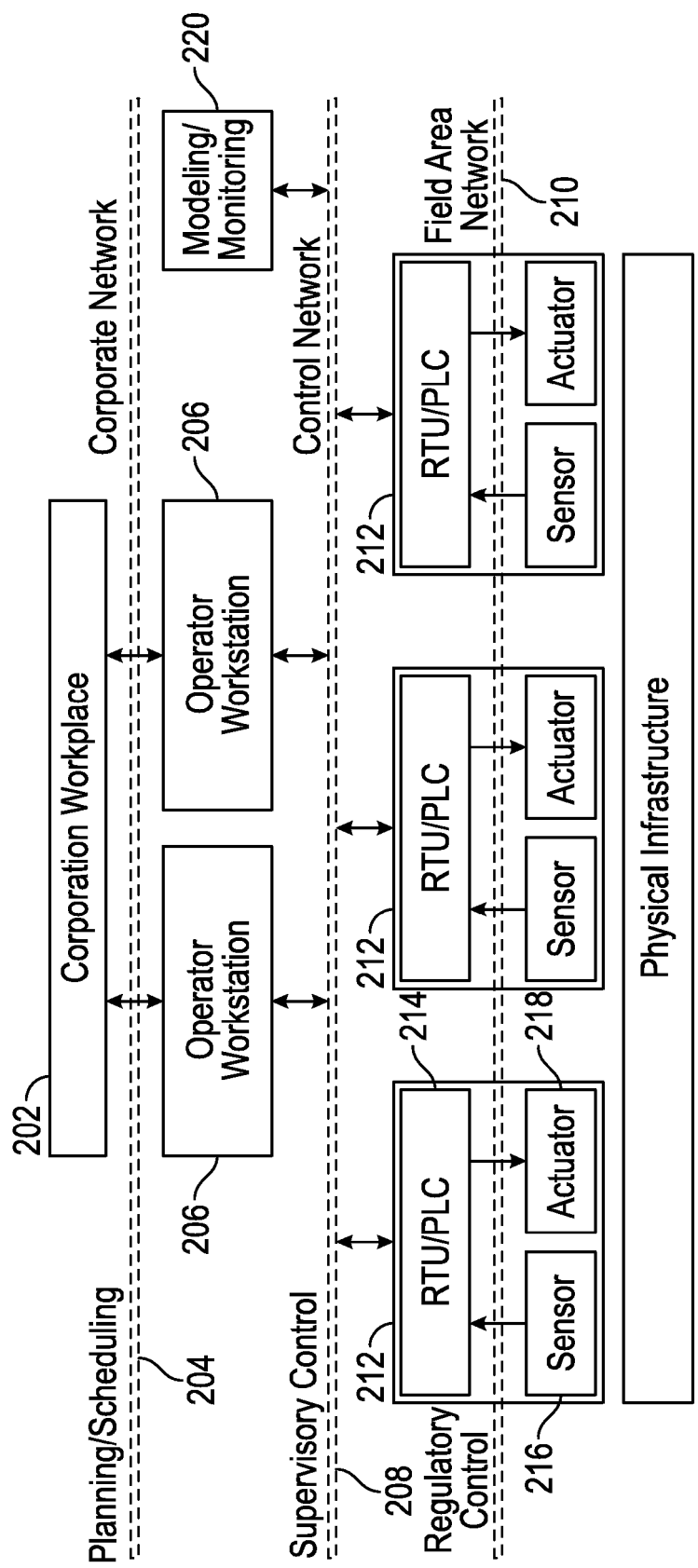
FIG. 2 is an hierarchical diagram of an industrial control system in accordance with some embodiments.

FIG. 2 is a hierarchical diagram of an industrial control system, with a modeling/monitoring apparatus 220 added thereto. Multiple controllers 212 are part of the physical infrastructure of the industrial control system. Each controller 212 is operating some equipment and performing some process or some part of the overall process of the industrial control system. For example, a first controller 212 has a remote terminal unit (RTU) or a programmable logic controller (PLC) as RTU/PLC 214, which receives input from a sensor 216 and sends output to an actuator 218. The controllers 212 are coupled to a field area network 210, i.e., the controllers 212 are coupled to each other via the field area network 210. Each of the controllers 212 is coupled to a control network 208. Operator workstations 206 are coupled to the control network 208. The operator workstations are also coupled to a corporate network 204 which spans the corporation workplace 202. The illustration in FIG. 2 is generic, and would include greater or fewer numbers of controllers 212, with specific functions and equipment in a specific industrial control system. Per the example of FIG. 1, the controllers 212 transmit information to the operator workstations 206, via the control network 208. The controllers 212 also send information to each other via the field area network 210. Operator workstations 206 send information to the controller 212 via the control network 208. In some embodiments, all of this information is in the form of messages, in various protocols. The form of these messages, and the generation of the model are further discussed below, with reference to FIGS. 3A-3E.

In various embodiments, the method of modeling or monitoring a control system described herein can be practiced in one of the operator workstations 206, for example by installing software into the operator workstation 206. In one embodiment, a control system modeling/monitoring apparatus 220, configured to practice the method of modeling or monitoring a control system, is installed in place of or in addition to one of the operator workstations 206. For example, a control system modeling/monitoring apparatus 220 could be implemented as an appliance that attaches to, i.e., sits on, the control network 208. In one embodiment, a control system modeling/monitoring apparatus 220 could be implemented as an appliance that attaches to the field area network 210. In alternative embodiments, the modeling/monitoring apparatus 220 couples to both the control network 208 and the field area network 210. The modeling/monitoring apparatus 220 may gather messages via a network port coupled to the network in some embodiments. It should be appreciated that the graphical representation for an industrial control system illustrated in FIG. 2 is one example and not meant to be limiting as the embodiments described herein may be extended to other graphical representations for various other control system.

Figure 3A:
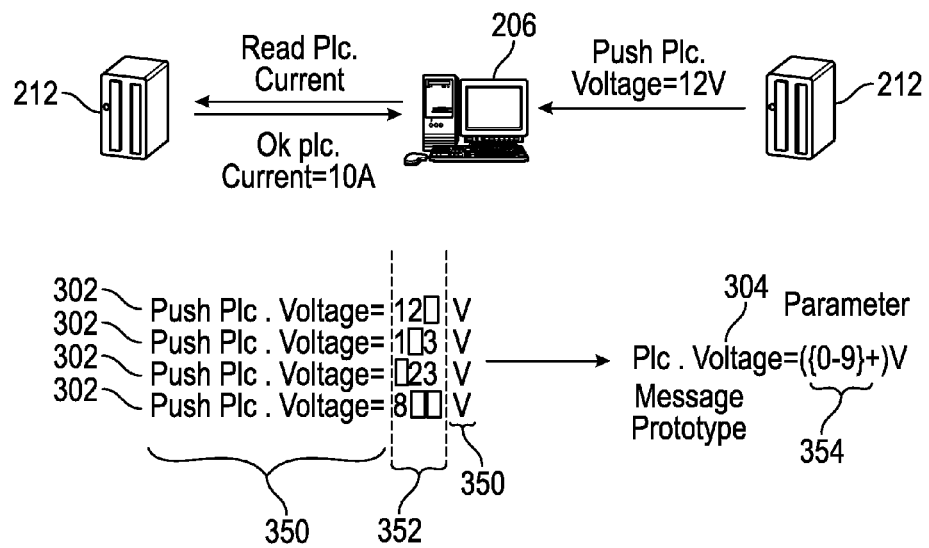
FIG. 3A is an action diagram showing message prototype generation, in accordance with some embodiments.

FIG. 3A is schematic diagram showing message prototype generation, in accordance with an embodiment of the present disclosure. Two of the controllers 212, and one of the operator workstations 206, from the industrial control system of FIG. 2 are represented in FIG. 3A. In this example, one of the controllers 212, labeled "C", sends a message, "PUSH plc.voltage=12V" to the operator workstation 206. In the context of the industrial control system, this message is conveying that a voltage of a programmable logic controller, e.g., of controller 212 "C", has a specified value, which is represented as a numerical value of a parameter. For example, this controller 212 could be regularly pushing or sending updates of this voltage value to the operator workstation 206, and this voltage value is then displayed in the human-machine interface on the operator workstation 206.

The operator workstation 206 of FIG. 3A, sends a message, "READ plc.current" to the controller 212 labeled "B". The controller 212 labeled "B", in response to receiving the message, sends a message, "OK plc.current=10A" back to the operator workstation 206. In the context of the industrial control system, this return message is conveying that a current of a programmable logic controller, e.g. of controller 212 "B", has a specified value, which is represented as a numerical value of a parameter. For example, the operator workstation 206 could be requesting regularly that the controller 212 send back an update on the value of the current, which the controller 212 then does. This value of the current is then displayed in the human-machine interface on the operator workstation 206.

These messages 302 are gathered during a learning phase, or training phase, in some embodiments. For example, FIG. 3A shows the PUSH messages from the controller 212 labeled "C". In practice, the learning or training phase includes gathering many more messages, from the controllers 212, so that the model can accurately represent regular operation of the industrial control system. The messages could include messages from controllers to a computing device, messages from a computing device to controllers, messages from one controller to another controller, etc. In systems that monitor the field area network 210 (see FIG. 2), messages could include messages from sensors to controllers or from controllers to actuators, etc. From the messages 302, message prototypes 304 are generated. FIG. 3A shows one message prototype 304, generated from the PUSH messages 302. In various embodiments, each type or category of message is used to generate a corresponding message prototype 304.

Still referring to FIG. 3, in order to generate the message prototypes 304, messages 302 that have a common unchanging portion, i.e., an invariant portion 350 of the message, are grouped together or categorized, as to types of messages, and the invariant portion 350 of the message is extracted. In this example, the invariant portion 350 of these messages 302 is the text phrase "PUSH plc.voltage=" along with the final "V". The invariant portion is that portion, i.e. text, of the message that is repeated in all of the messages of a particular group. In this same particular group, the changing portion of the message, i.e., the variable portion 352 that changes from one message to the next in a group of messages 302, is extracted as a set of values of a parameter 354. FIG. 3A designates that the parameter 354 in this example message prototype 304 uses the decimal digits zero through nine. Here, the message prototype 304 for the messages 302 includes the invariant portion 350 of the messages 302, an indication of a parameter 354, and statistical information about values of the parameter 354. It should be appreciated that message prototypes could have other formats, as could the statistical information about values of the parameter 354. For example, the values of the parameter 354 could be represented as random, or a central or stable value with a distribution about the central value, an open-ended range, a closed range and so on. In some embodiments, extra spaces or other symbols are either accounted for, e.g., as having a range, or removed, so that the message prototype 304 is insensitive to spaces or space-filling characters.

Message prototype generation aims at the construction of a semantic skeleton for the different network interactions that can be observed in the environment in accordance with some embodiments. As previously explained, the system does not assume a-priori knowledge of the message format. The message format is inferred from network observables by means of protocol learning techniques. This is done by first grouping together a set of network messages that are associated with the same semantic value (message clustering), and then by abstracting invariants out of this set of messages (through application of region synthesis). The message clustering leverages the message content and the role of a specific host in the network to generate a set of messages that are likely to have a similar level of semantics. Embodiments of the method and apparatus look at all the messages generated by each host in the network towards another endpoint, and cluster this set of messages by looking at their payload content. Among the different notions of distance, local alignment techniques may have optimal performance since they provide a notion of distance that is robust to mutating size fields. After having grouped messages on a per-host basis, hosts sharing high similarities among the generated messages (e.g. hosts covering the same role in the industrial control systems) are identified and grouped together in some embodiments.

For each cluster (composed of a set of highly similar messages), embodiments of the method and apparatus extract invariants by using a process called region synthesis in some embodiments. The idea region synthesis includes aligning the different messages, e.g., using Needleman Wunsch alignment algorithms, by inserting "gaps" and maximizing the overlap between the messages. Even in the presence of fields of mutating length, embodiments of the method and apparatus identify invariant bytes that appear in all the instances of the message in a particular group of messages. The output of region synthesis is a regular expression that captures the invariant bytes of all the messages in the initial set.

For instance, given the following set of messages:
SET current level=12;
SET current level=21;
SET current level=13;
SET current level=32;
the outcome of the region analysis step produces the following regular expression:
SET current level=[0-9]{2};

The regular expression generated by this step, called the message prototype, captures the semantics of a specific message type. Further messages with similar semantics will match the same regular expression. Mutating parts of the message can be considered as arguments or parameters of a specific message, and are used further, in the time series generation and the model generation.

Figure 3B:
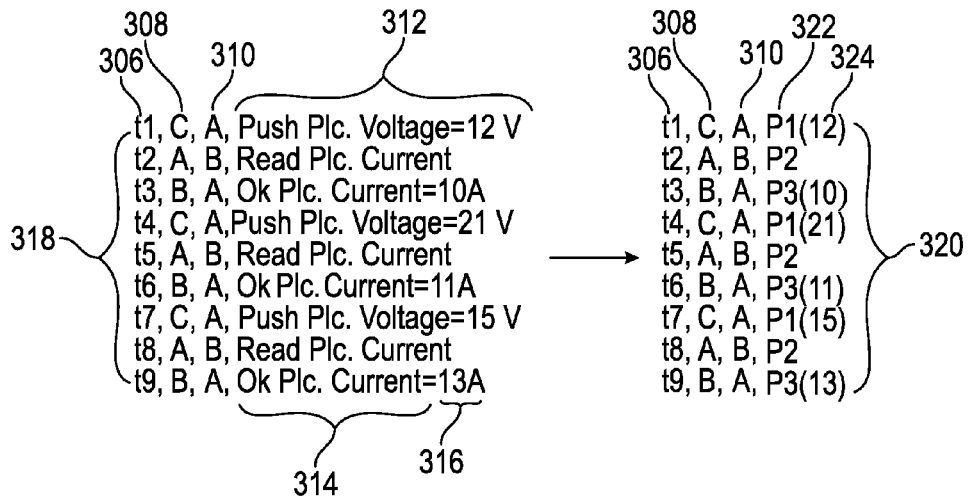
FIG. 3B is an action diagram showing further aspects of message prototype generation, and time series generation, in accordance with some embodiments.

FIG. 3B is a schematic diagram showing further aspects of message prototype generation, and time series generation, in accordance with some embodiments. Once all the message prototypes 304 have been generated, they can be used to label the different message interactions generated in a specific environment. Messages matching a specific prototype will be labeled by that prototype, and the label will allow distinguishing messages with similar semantics within the network stream. The network stream thus becomes (i.e., can be represented in) a time series, where every event is associated with a source host, a destination host, a message prototype, and a set of parameters that correspond to the variable part of the message (the "arguments" or parameters of the prototype regular expression) as applicable.

As illustrated in FIG. 3B, a series of messages 318 is organized in a sequential fashion, prior to generation of a time series 320 according to the message prototypes 322. Each of the messages 312 is accompanied by a timestamp 306, a source 308, and a destination 310. For example, the first of the messages in the series of messages 318 occurred at timestamp t1, and was sent from a source "C", e.g., the controller 212 labeled "C" of FIG. 2, to a destination "A", e.g., the operator workstation 206 labeled "A" of FIG. 2, and included the message content as shown. Messages 318 may have an invariant portion 314 and a parameter 316. For conversion to the time series, each message is replaced by an indication of the message prototype corresponding to the message, for example the letter "P" followed by a number. The time series 320 represents each of the messages 312 with a timestamp 306, a source 308, a destination 310, an indicator of a message prototype 322, and a value of a parameter 324. For example, the first message of the series of messages 318 is represented in the time series 320 as having a timestamp 306 at time "t1", a source 308 "C", a destination 310 "A", a message prototype 322 "P1", and a parameter 324 of value "12". Some messages in the time series 320 have parameters, e.g., the first, third and fourth messages, and some messages in the time series 320 lack a parameter 324, e.g., the second, fifth and eighth messages in the example of FIG. 3B. Other formats for a time series 320 and contents of the time series 320 are readily devised in accordance with the teachings herein. It should be appreciated that the time series 320 is protocol agnostic, i.e., the time series 320 and generation thereof depends on the above-discussed aspects of the messages and does not require deep knowledge of protocols or knowledge of which message conforms to which protocol.

Figure 3C:
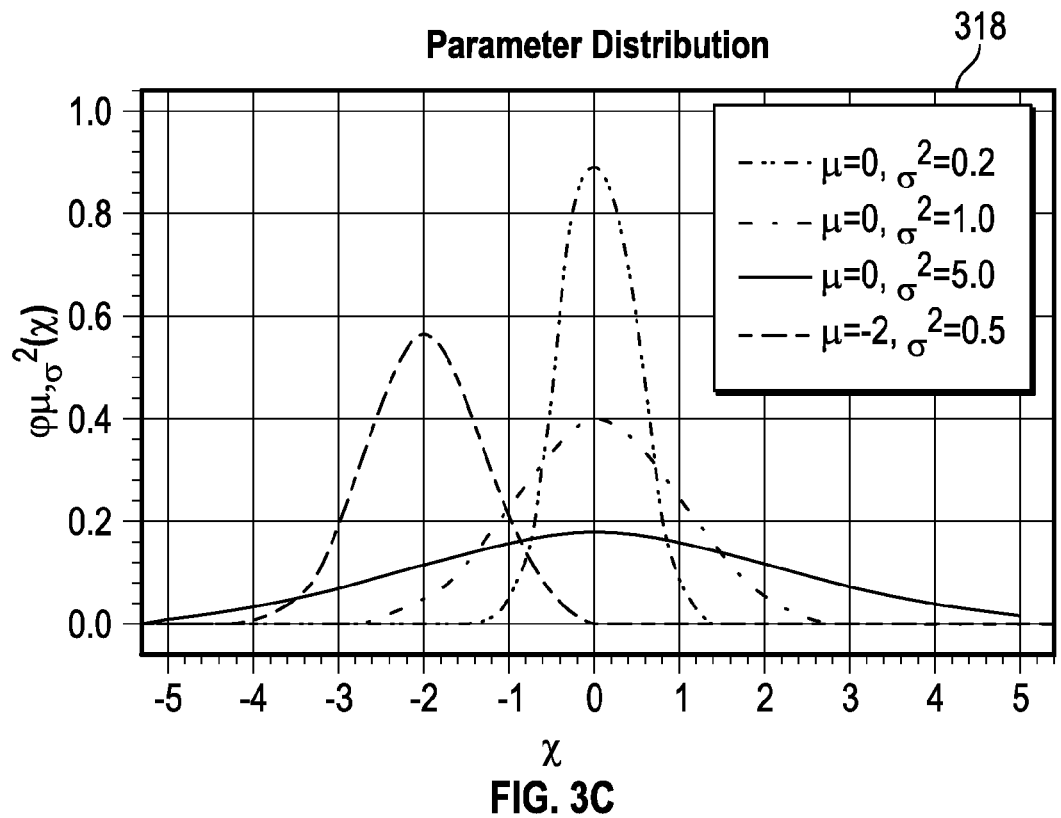
FIG. 3C is a graph showing parameter distribution in accordance with some embodiments.

FIG. 3C is a graph showing parameter distribution 338. A variable parameter extracted from a specific type of message has a value that changes from one message to the next. In other words, values of the parameter can be extracted from messages of the specific message type, and these values have a distribution. For example, a parameter may have random values in some embodiments. A parameter may have an approximately Gaussian distribution of values or other distribution of values about a central or stable value in some embodiments. Some examples of parameter distribution are shown in the parameter distribution 338 by the various curves illustrated in the parameter distribution. Further examples of parameter distribution are readily devised as parameter distribution is meant to be an example and not limiting.

Figure 3D:
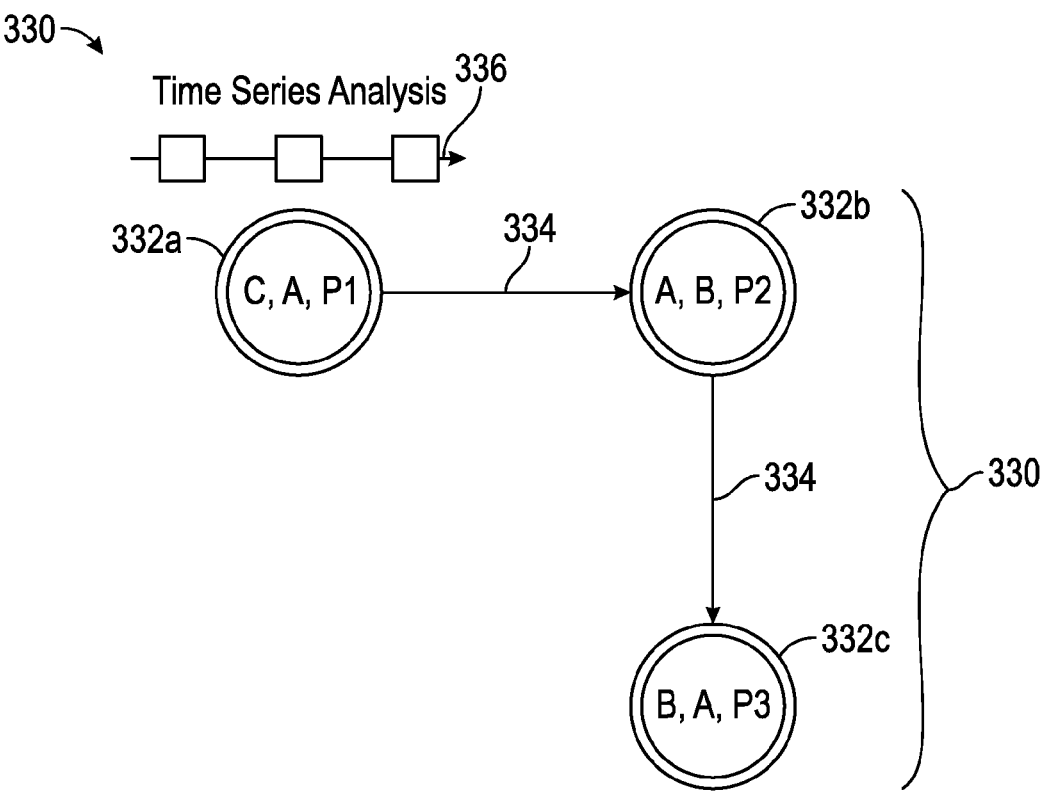
FIG. 3D is a model diagram, showing a model of an industrial control system, and aspects thereof, in accordance with some embodiments.

FIG. 3D is a model diagram, showing a model 330 of an industrial control system, and aspects thereof, in accordance with some embodiments. It should be appreciated that model generation can be performed in various ways, and various kinds of models can be generated. In one embodiment, model generation includes a transformation of the time series into a model capturing the overall behavior of the system at steady state. It is a goal for this stage to produce an "interpretable" model, so that whenever an alert is generated because of a deviation from the generated model, it is possible to explain the reasons for the alert and the nature of the deviation.

In one embodiment, the generated model includes a deterministic finite automaton (DFA) or a finite state machine (FSM). Each state of the deterministic finite automaton or the finite state machine represents the occurrence of a specific event between two hosts, e.g., a message sent from a source host to a destination host, and the state transition table or state matrix is empirically reconstructed from the observed events in the context of the training phase. Strong transition probabilities between two states are attached to the model as "cause-effect" associations (e.g., a server responding to a specific client request, since the server response always follows the client request). On top of deriving the state transition table from the training phase, one embodiment annotates the finite state machine model with information that is instrumental to capture the normal operation of the industrial control system. Examples of such information are described below.

One such type of information that captures the normal or steady state operation of an industrial control system is time dynamics. Many events in an industrial control system are timed, and occur at preconfigured time intervals. For instance, a specific controller or programmable logic controller may report its current state every second or some other regular time period. It is straightforward to identify within the constructed deterministic finite automaton the cases in which a transition to a given state happens at regular points in time regardless of the previous state, and model these cases accordingly in order to expect transition to a state at a given point in time. Deviations from the expected repetitive behavior are strong indicators of anomalous activities (e.g., a programmable logic controller which crashed, was rebooted, or was repurposed in a cyber-attack).

Another type of information that captures the normal or steady state operation of an industrial control system is parameter distribution, such as shown in FIG. 3C. The mutating parts of a specific message prototype (that are described above as parameters or arguments) are likely to be associated to nonce values, i.e., random numbers applied to match an inquiry and a corresponding response in network traffic, timestamps, or to specific values being reported or being set. It becomes particularly useful to closely model the distribution of these values to identify outliers. While a nonce value is likely to be randomly distributed, values associated to the current state of the physical system are likely to have very specific distributions, and deviations from such distributions are indicators of anomalous behavior. The annotated model generated can thus be used to "follow" the operation of the industrial control system at steady state. Significant deviations from the model are strong indicator of an anomaly and can be brought to the attention to an operator.

In the example of a generated model 330 shown in FIG. 3D, the model 330 is a finite state machine having three states 332a-c. For purposes of discussion, these states 332a-c are (arbitrarily) a first state 332a (at top left), a second state 332b (at top right), and a third state 332c (at bottom). Other finite state machine models or deterministic finite automaton models will have other numbers of states or associations with the states, as appropriate to the model and the control system being modeled. For example, the industrial control system depicted in the human-machine interface 102 of FIG. 1 would likely have many more states. In the example shown in FIG. 3D, each of the states 332a-c is associated with a message prototype, e.g., P1, P2 or P3, a source of the message prototype, e.g., C, A, B, and a destination of the message prototype, e.g., A, B, A, respectively for the first, second and third states 332a-c. A first state transition 334 indicates the transition between the first state 332a and the second state 332b. A second state transition indicates the transition between the second state 332b and the third state 332c. In some embodiments, the state transitions 334 are associated with respective probabilities for the transitions between the states 332a-c. These probabilities are based upon the time series analysis 336, e.g., the probabilities are based upon the cause-effect relationships and periodicities that are extracted from the time series 320.

In some embodiments, a message type, e.g., as represented using one of the message prototypes, that is regularly repeated has a periodicity that can be extracted from the time series 320. A message type that regularly follows another message type, or a message type that is followed regularly by another message type, has a cause-effect relationship that can be extracted from the time series 320. These periodicities and cause-effect relationships can be annotated to or otherwise attached to the model, for example by associating them with states 332a-c and state transitions 334 as appropriate.

Still referring to FIG. 3D, in some embodiments of a model 330, the states 332a-c are associated with parameter distributions 338 of the respective parameters of FIG. 3C. For example, a parameter associated with the first state 332a, e.g., a voltage or a current or other parameter, could have a symmetric distribution about a central or stable value as shown in some of the curves in the parameter distributions 338 of FIG. 3C. Parameters could also have asymmetric distributions, random distributions, narrower or wider distributions, a small number of discrete values, a range of analog values converted to digital values, etc. It should be appreciated that, although the model 330 is shown in graphical form in FIG. 3D, models could be represented in a computer memory in the form of a table, a database, a simulation, a spreadsheet or other data format. It should be further appreciated that various models can be devised to represent the above-discussed aspects of messages, message prototypes, parameters and associated values, periodicities and/or cause-effect relationships or other relationships etc. In addition, the models are not limited to being or including finite state machine models or deterministic finite automaton models as the models illustrated in the Figures are illustrative and not meant to be limiting.

In some embodiments, the model of FIG. 3D is annotated in various ways. For example, the model could include annotation to each state of the model as to a corresponding message prototype. The model could include annotation to some of the states as to periodicity of the state in some embodiments. The model could include annotation to transitions between states as to probability of the transition. The model may include annotating some of the states as to a parameter, and distribution of values of the parameter. Various types of annotations, and information to be included in an annotation, are readily devised in accordance with the teachings disclosed herein.

FIG. 3E is an example of a state transition table 340, which may be used in model generation. In this state transition table 340, one column shows the state from which the transition occurs, another column shows the state to which the transition proceeds, and yet another column shows the probability of the transition from the one state to the next state. For example, the transition from state S0 to state S1 occurs with a probability of 0.8 in this state transition table 340. State S0 never transitions directly to state S2, which is indicated by the zero probability of this transition in this state transition table 340. Other formats for state transition table 340 are readily devised. The state transition table 340 could be derived from or generated from analysis of the time series 320. The state transition table 340 could then be used in the generation of the model 330, or in some embodiments could be associated with the model 330.

FIG. 3F is an example of a state matrix 342, which may be used in model generation. The state matrix has similar information to the state transition table 340, and can be generated and applied in similar fashion. In this example, the state matrix 342 shows on the left side states from which a transition may occur, and shows on the top states to which a transition may occur. At the row and column intersection of the from states and the to states, the probability of the transition from the first state to the second state is indicated. For example, a transition from the state S0 to the state S1 has a probability of 0.8 in this state matrix 342. Some states may have a zero probability of transition. For example, there is never a transition from the state S0 to the state S2, as indicated in this particular example of a state matrix 342. The top-left to bottom-right diagonal could be used to indicate periodicity of states, for example, the intersection of the state S0 and the same state S0 could indicate that the likelihood of the transition is 1.0, i.e., always repeats, and/or could indicate a time period or a frequency of repetition, or could be blank or have a null character, e.g. an "X" or other symbol to indicate not applicable, etc. Other formats for a state matrix 342, and other contents of a state matrix 342, are readily devised in accordance with the teachings herein.

With reference back to FIG. 2, in various embodiments the modeling/monitoring apparatus 220, or an operator workstation 206 configured to practice the disclosed method, generates a model as described above with reference to FIGS. 3A-3F. The modeling/monitoring apparatus 220, or the specially configured operator workstation 206, or other apparatus practicing the disclosed method, then monitors messages in the industrial control system and compares messages to the model. If a message is an outlier, i.e., if a message deviates from or fails to conform to the model, the apparatus practicing the disclosed method then indicates an anomaly, i.e., nonconformance. This indication could come in the form of a communication, e.g., sending a message, producing a report, setting a status indication, activating alarm, performing an action such as shutting down part or all of the industrial control system or activating an emergency procedure, etc. An outlier message, i.e., a message deviating from the model, could have a parameter value that is an outlier in comparison to parameter values in the corresponding type of message, could have a timestamp that deviates from the periodicity that was extracted for that type of message, or could deviate from the cause and effect dependency that was extracted as relates to that type of message. Other types of outlier messages are readily understood in the context of the present disclosure.

Figure 4:
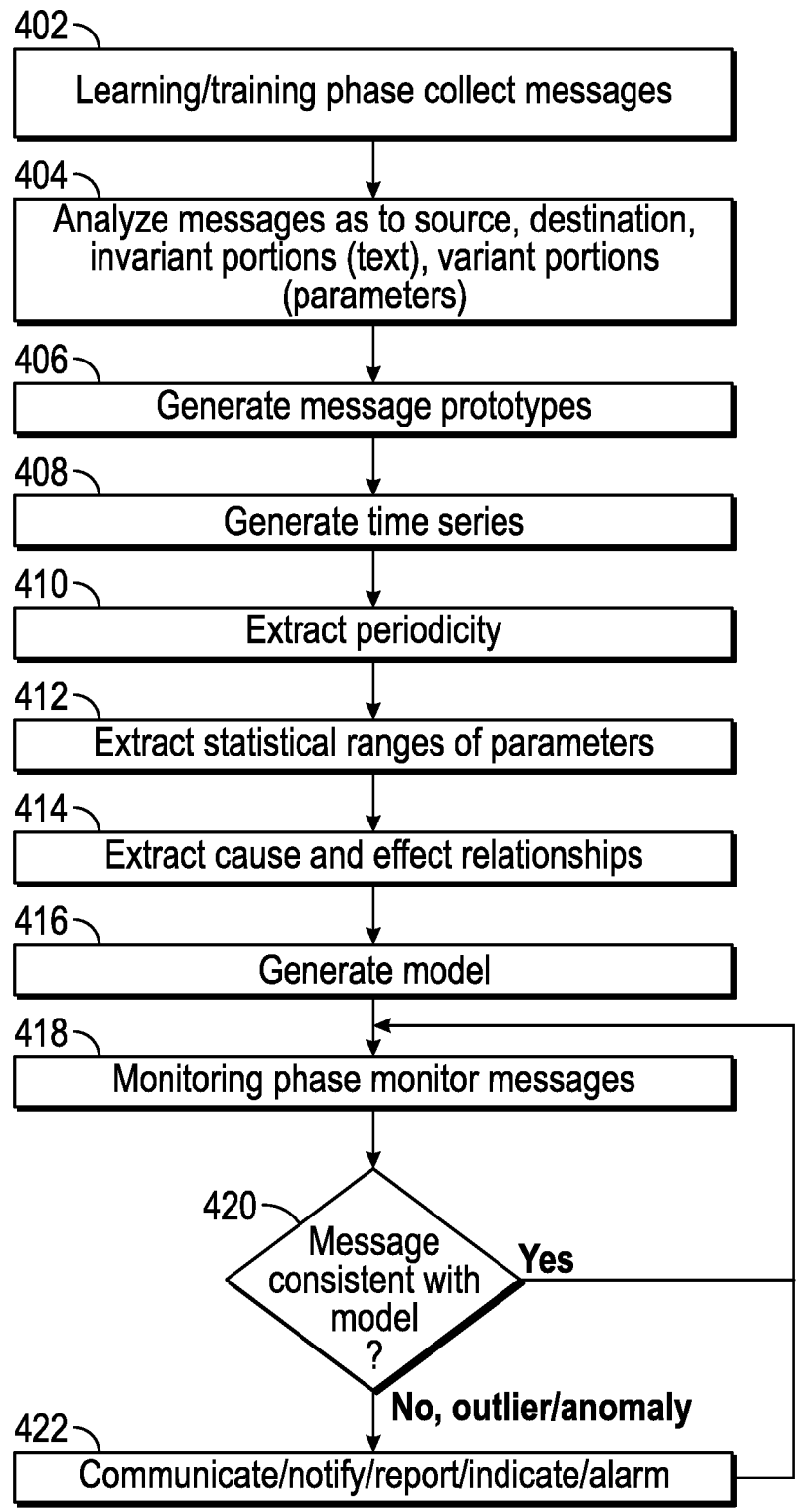
FIG. 4 is a flow diagram showing a method of modeling or monitoring a control system, which can be practiced in an industrial control system as depicted in FIGS. 1 and 2, using actions shown in FIGS. 3A-3C and a computing device such as shown in FIG. 5 in accordance with some embodiments.
Figure 5:
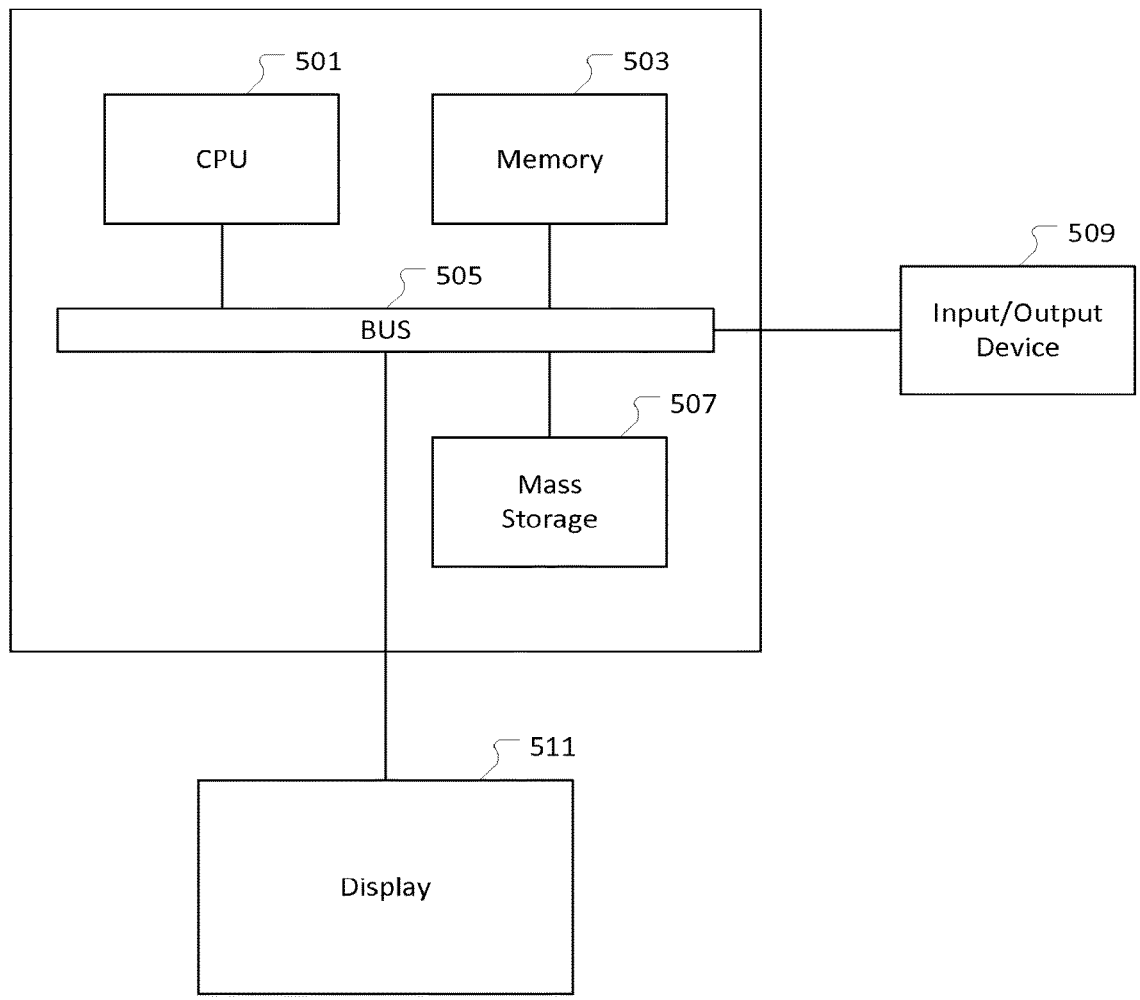
FIG. 5 is an illustration showing an exemplary computing device which may implement the embodiments described herein.

FIG. 4 is a flow diagram showing a method of modeling or monitoring a control system, which can be practiced in an industrial control system as depicted in FIGS. 1 and 2, using actions shown in FIGS. 3A-3F and a computing device such as shown in FIG. 5. Particularly, the method can be practiced using a control system monitoring apparatus with at least one processor therein. In an action 402, messages are collected during a learning/training phase. These messages are collected from controllers in a control system, for example by intercepting or otherwise gathering messages from any network to which the controllers are coupled.

The messages are analyzed, in an action 404, as to source, destination, invariant portions, e.g., text, and variant portions, e.g., parameters. As part of the analysis, the messages could be categorized as to types of messages as described above. Message prototypes are generated, in an action 406. Various formats could be applied, including formats as discussed above. For example, a message prototype could include an invariant portion of a message, and a variable portion of a message.

A time series is generated, in an action 408. For example, a time series of messages could include a timestamp, a source, a destination, an indicator of a message prototype, and a value of a parameter, as applicable, for each message in the time series. Periodicity is extracted, in an action 410. For example, analysis of the time series can show repeated types of messages, and a time between repetitions of these types of messages can be determined. Statistical ranges of parameters are extracted, in an action 412. For example, an analysis of the values of the parameters in the time series can show whether a parameter is random, i.e., has random values, or has a distribution about a stable or common value i.e., has values in the messages that show such a distribution.

Cause and effect relationships are extracted, in an action 414. For example, an analysis of the time series can show when one type of message is followed by another type of message, and this is represented as a cause-effect relationship. A model is generated, in an action 416. The above-discussed types of models, contents and representations in models, and techniques for generating models, and others as readily devised in keeping with the teachings described herein, are applicable. Messages are monitored, in an action 418, during a monitoring phase. These messages can be collected or gathered in a similar manner as applied during the learning/training phase. It should be appreciated that the generated model includes time-series analysis and cause-effect relationships, and includes in the modeling both message types and endpoints (source/destination) that are involved in the communication or message exchange. For example, it may be acceptable to see a message of type "X" between source "A" and destination "B", but observing the very same message type sent by a third party "C" towards "B" may be a very strong index or indication of a cyber-attack.

In a decision action 420, a question is asked, is the message consistent with the model? The question would be asked of any of the messages monitored in the action 418. If the answer is yes, the message is consistent with the model, then the flow branches back to the action 418 for ongoing monitoring of messages. If the answer is no, the message is not consistent with the model, i.e., the message is an outlier or an anomaly, then the flow proceeds to the action 422. In the action 422, an alarm or other indication is communicated, or the system notifies, reports or otherwise indicates the outlier or the anomaly. This action 422 is in response to finding that a message is inconsistent with the model. After the action 422, flow proceeds back to the action 418 for ongoing monitoring. In further embodiments, other actions could take place in further response to finding that a message is inconsistent with a model. For example, instructions could be issued to shut down the system, or start an emergency process, etc.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the control system model generation and control system monitoring in accordance with some embodiments. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, or other known operating systems. It should be appreciated that the embodiments described herein may be integrated with a virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

With reference to FIGS. 1-5, advantages of embodiments of the disclosed method and apparatus are readily apparent. Embodiments of the generated model provide a foundation for explaining how an observed message deviates from operation of the control system as observed during the learning/training phase. This contrasts with other approaches which render the objective of understanding the nature and cause of an anomaly particularly complex for an operator. Application of a protocol agnostic approach obviates the need of inferring protocol structure from analysis of protected software, and removes any requirement of building specific parsers for different protocols. Embodiments of the disclosed method and apparatus have independence from attack vectors, because a message deviating from the generated model is observed independently of which attack vector caused this to happen. In some embodiments, alerts are annotated, which supports pinpointing a cause for a specific alert and generation of an explanation of how the system has deviated from the internal model. This is particularly useful in an industrial control system, where a false alarm may have potentially catastrophic consequences on a physical system. As add-on security to an industrial control system, embodiments of the disclosed method and apparatus do not require modification to the controllers. Embodiments could be implemented on top of switch hardware, as a hardware appliance to be attached to a switch mirror port, or otherwise added to an existing industrial control system, even a legacy system. In some embodiments, the code executing the functionality described herein may be integrated into the embedded systems of an industrial control system as firmware, hardware, software or some combination thereof.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations. In some embodiments the functionality described herein may be integrated into a controller or processor as hardware, software, firmware, or some combination thereof.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for modeling or monitoring a control system, performed by a control system modeling and monitoring apparatus, comprising:
   deriving, through protocol learning and without a priori knowledge of specific message formats and protocols of the control system, a plurality of message prototypes from a plurality of messages of the control system, the plurality of messages gathered from the control system during operation of the control system wherein the plurality of messages come from components that are located within the control system, the deriving comprising:
      message clustering to group together sets of messages associated with a same semantic value; and
      abstracting invariance out of each set of messages through application of region synthesis, with each message prototype capturing semantics of a specific message type;
   generating a time series involved in a message exchange and cause-effect relationships;
   deriving periodicity and the cause-effect relationships among the plurality of message prototypes based on the time series; and
   constructing a model of the control system, based upon the derived message prototypes and the derived relationships among the plurality of message prototypes, wherein each of a plurality of states of the model indicates one of: the plurality of message prototypes, a source of the message prototype, and a destination of the message prototype, wherein the source and destination are members of the control system, and wherein at least one method operation is executed through a processor.

2. The method of claim 1, wherein:
   the plurality of message prototypes indicates one or more of: sources of messages, destinations of messages, invariant portions of messages, and statistical information relating to parameters in messages; and
   the model indicates one or more of: transition probabilities relating to the plurality of message prototypes; transition probabilities based on the cause-effect relationships; distributions of values of the parameters; distributions based on the statistical information; repetition among the message prototypes; and repetition based on the periodicity.

3. The method of claim 1, further comprising:
   monitoring further messages of the control system; and
   reporting when at least one of the further messages includes an outlier relative to the model.

4. The method of claim 1, wherein:
   the control system includes controllers coupled in a network; and
   the plurality of messages includes at least one of a message from a first controller to a computing device, a message from the computing device to a second controller, a message from the first controller to the second controller, and a message from the second controller to the first controller.

5. The method of claim 1, wherein:
   the plurality of messages is gathered, during a learning phase, from a network having devices of the control system coupled thereto; and
   further messages are gathered for comparison to the model, during a monitoring phase.

6. The method of claim 1, wherein:
   the model includes a finite state machine model;
   each state of the finite state machine model relates to one of the plurality of message prototypes;
   each transition between states of the finite state machine model relates to a transition probability;
   at least one state of the finite state machine model relates to a periodicity; and
   at least one state of the finite state machine model relates to a distribution of values of a parameter.

7. The method of claim 1, wherein:
   the generating of the time series is based on the plurality of message prototypes, on time stamps of the plurality of messages, and on a source and a destination involved in the message exchange.

8. The method of claim 1, further comprising:
   extracting parameter values that change among messages having a same source, a same destination, and a same invariant portion; and
   deriving statistical information relating to the parameter values, wherein the model indicates the statistical information relating to the parameter values, as relates to the message prototypes.

9. A non-transitory, tangible, computer-readable media having instructions thereupon which, when executed by a processor, cause the processor to perform a method comprising:
   categorizing, into types of messages, according to message source, message destination, repeated and unchanging portion of message, and variable parameter portion of message, through protocol learning, message clustering, region synthesis, and without a priori knowledge of specific message formats and protocols of a control system, a plurality of messages of networked controllers in a control system, the plurality of messages collected from a network of the networked controllers wherein the plurality of messages are from within the control system;
   generating a time series involved in a message exchange and cause-effect relationships;
   analyzing the plurality of messages as to periodicity and the cause-effect relationships according to the categorizing and based on the time series; and
   generating a model of the control system according to the categorizing and the analyzing, the model indicating periodicity in at least one type of message, the model indicating a cause and effect relationship between at least two types of messages, the model indicating at least one value of a variable parameter in at least one type of message, each of a plurality of states of the model indicating one of a plurality of message prototypes, a source of the message prototype, and a destination of the message prototype, wherein the source and destination are members of the network controller in the control system, with each message prototype capturing semantics of a specific message type.

10. The computer-readable media of claim 9, wherein the method further comprises:
    monitoring further messages of the networked controllers;
    comparing at least one of the further messages as to conformance to the model; and
    indicating nonconformance in response to the at least one of the further messages failing to conform to the model.

11. The computer-readable media of claim 10, wherein:
    the plurality of messages is collected in a training phase; and
    the further messages are collected in a monitoring phase.

12. The computer-readable media of claim 9, further comprising:
- annotating each of a plurality of states of the model as to one of a plurality of message prototypes;
- annotating each state of at least a subset of the plurality of states of the model as to periodicity of the state;
- annotating each transition of a plurality of transitions between states of the model as to probability of the transition; and
- annotating each state of at least a subset of the plurality of states of the model, the state having a parameter that varies among a subset of the plurality of messages as associated with the state, as to distribution of values of the parameter.

13. The computer-readable media of claim 9, wherein:
- generating the model includes generating one of a state transition table or a state matrix; and
- the model is based on the state transition table or the state matrix.

14. The computer-readable media of claim 10, wherein the at least one of the further messages failing to conform to the model includes the at least one of the further messages having a parameter value that is an outlier in comparison to the at least one value of the variable parameter in the at least one type of message.

15. A control system monitoring apparatus, comprising:
- a memory;
- a network port, configured to couple to a network having a plurality of controllers coupled thereto; and
- a processor, coupled to the memory and to the network port, the processor configured to perform actions including:
  - characterizing, through protocol learning, message clustering, region synthesis, and without a priori knowledge of specific message formats and protocols of the control system, by generating a plurality of message prototypes each capturing semantics of a specific message type, each of a plurality of messages as to source, destination, unchanging and changing portions of the messages, the plurality of messages communicated among the plurality of controllers and gathered from the network, via the network port, during a training phase wherein the plurality of messages are from within a control system;
  - generating a time series based on the characterized plurality of messages and involved in a message exchange and cause-effect relationships;
  - extracting a periodicity of repeating messages and the cause-effect relationships in the time series, each of the repeating messages having a same unchanging portion of the message;
  - extracting a statistical range of at least one of the changing portions of the messages;
  - extracting a cause and effect dependency of at least one characterized type of message on another characterized type of message, based on the time series;
  - forming a model, in the memory, based on the characterized plurality of messages, the periodicity, the statistical range, and the cause and effect dependency, each of a plurality of states of the model indicating one of the plurality of message prototypes, the source of the message prototype, and the destination of the message prototype, the source and destination are members of the plurality of controllers in the control system;
  - comparing at least one further message, gathered from the network during a monitoring phase, to the model; and
  - communicating regarding an anomaly in an event of the comparing showing a deviation of the at least one further message from the model.

16. The control system monitoring apparatus of claim 15, wherein the deviation includes one of: deviation of a time stamp of the at least one further message from the periodicity, deviation of a value of a parameter of the at least one further message from the statistical range, and deviation of the at least one message from the cause and effect dependency.

17. The control system monitoring apparatus of claim 15, wherein:
- the characterizing includes generating a plurality of message prototypes, each of the plurality of message prototypes corresponding to one or more of the plurality of messages; and
- each of the plurality of message prototypes includes a source of a message, a destination of the message, and at least one of a label indicating the unchanging portion of the message or at least one parameter value indicating the at least one of the changing portions of the messages.

18. The control system monitoring apparatus of claim 15, wherein the characterizing and the forming the model are protocol agnostic.

19. The control system monitoring apparatus of claim 15, wherein:
- the model includes a plurality of states;
- each state of the plurality of states corresponds to a type of message among the plurality of messages as characterized;
- each transition between states of the model indicates a probability of the transition, based on the time series;
- at least one state of the model indicates a range of values of a one of the changing portions of the messages as relates to the at least one state; and
- at least one state of the model indicates the periodicity as relates to the at least one state.

20. The control system monitoring apparatus of claim 15, wherein extracting the statistical range of the at least one of the changing portions of the messages includes determining whether a parameter of a type of message has random values versus a stable value and a distribution about the stable value, in the plurality of messages.

* * * * *